US006168773B1

United States Patent
Sharp

(10) Patent No.: US 6,168,773 B1
(45) Date of Patent: Jan. 2, 2001

(54) RAPID PROCESS FOR MAKING SILICA GEL AND SILICATE POLYMER AND LOW DENSITY GELS MADE THEREBY

(75) Inventor: Kenneth George Sharp, Landenberg, PA (US)

(73) Assignee: E. I. du Pont de Nemours and Company, Wilmington, DE (US)

(*) Notice: Under 35 U.S.C. 154(b), the term of this patent shall be extended for 0 days.

(21) Appl. No.: 09/091,051

(22) PCT Filed: Dec. 16, 1996

(86) PCT No.: PCT/US96/19994

§ 371 Date: Jun. 10, 1998

§ 102(e) Date: Jun. 10, 1998

(87) PCT Pub. No.: WO97/22632

PCT Pub. Date: Jun. 26, 1997

Related U.S. Application Data

(60) Provisional application No. 60/009,112, filed on Dec. 20, 1995.

(51) Int. Cl.[7] ............................. C08G 77/02; C01B 33/16
(52) U.S. Cl. ........................ 423/338; 423/335; 423/326
(58) Field of Search .................................. 423/335, 338, 423/326

(56) References Cited

U.S. PATENT DOCUMENTS

| | | | | |
|---|---|---|---|---|
| 3,526,603 | * | 9/1970 | Acker | 423/338 |
| 3,869,409 | * | 3/1975 | Bebris et al. | 423/335 |
| 3,888,972 | * | 6/1975 | Kiselev et al. | 423/335 |
| 3,975,293 | * | 8/1976 | LePage | 423/338 |
| 5,275,796 | * | 1/1994 | Tillotson et al. | 423/338 |
| 5,459,198 | | 10/1995 | Sharp | 525/102 |
| 5,876,686 | * | 3/1999 | Michalczyk et al. | 423/338 |

FOREIGN PATENT DOCUMENTS

| | | | |
|---|---|---|---|
| 0 232 024 A2 | 8/1987 | (EP) | ............ C08L 83/06 |
| 62-100443 | * 5/1987 | (JP) . | |
| 5-319867 | * 12 1993 | (JP) . | |
| 7-179850 | * 7/1995 | (JP) . | |
| 8-239225 | * 9/1996 | (JP) | .................. 423/338 |

OTHER PUBLICATIONS

K.C. Kumara Swamy et al., NMR Spectroscopy of New Pentacoordinated Siliconates and Phosphoranes, 187–196, (No Month).
T.M. Tillotson et al., Transparent ultralow–density silica aerogels prepared by a two–step sol–gel process, *Journal of Non–Crystalline Solids*, 145, 44–50, 1992, (No Month).
K.C. Kumara Swamy et al., Pentacoordinate Acyclic and Cyclic Anionic Oxysilicates. A Si NMR and X–ray Structural Study, *J. Am. Chem. Soc.*, 112, 2341–2348, 1990, (No Month).
Lawrence W. Hrubesh et al., Characterization of Ultralow–Density Silica Aerogels Made From A Condensed Silica Precursor, *Mat. Res. Soc. Symp. Proc.* 180, 315–319, 1990, (No Month).
V. Gottardi et al., Further Investigations on Raman Spectra of Silica Gel Evolving Toward Glass, *Journal of Non–Crystalline Solids*, 63, 71–80, 1984, (No Month).
E.J.A. Pope et al., Sol–Gel Processing of Silica, *Journal of Non–Crystalline Solids*, 87, 185–191, 1986.
S. Akira et al., Abstract No. JP 8239225, Mar. 25, 1994.

* cited by examiner

*Primary Examiner*—Ngoc-Yen Nguyen

(57) ABSTRACT

This invention relates to a rapid process for the preparation of a silica gel or a silicate polymer comprising contacting at least one fluoroalkoxysilane with a solution comprising water, optionally in the presence of a solvent and/or a catalyst. Low density gels can be prepared using this process and can possess large pore size, greater than 50 nm.

13 Claims, No Drawings

RAPID PROCESS FOR MAKING SILICA GEL AND SILICATE POLYMER AND LOW DENSITY GELS MADE THEREBY

This application is the 35 U.S.C. 371 national entry of PCT/US96/19994, filed Dec. 16, 1996 which claims priority from U.S. provisional application No. 60/009,112, filed Dec. 20, 1995.

FIELD OF THE INVENTION

This invention concerns a process for producing silica gel or silicate polymer by rapidly conducting sol-gel chemistry using a fluoroalkoxysilane as a starting material. Extremely low solids content silica gel produced by this process can posses large pore size.

BACKGROUND OF THE INVENTION

Inorganic gel can be generated from molecular precursors through room temperature hydrolytic and condensation sol-gel reactions. Such reactions generally require cosolvents for the essential reactants, water and the molecular precursor compound, such as a tetraalkoxysilane, and are catalyzed by either acid or base.

Very low density gels are useful as precursors to low density aerogels made by supercritical fluid drying and as separation media for large molecules such as proteins and polymers. Aerogels are the best acoustic and thermal insulating materials known. However, simple conventional gel precursors, such as tetramethoxysilane or tetraethoxysilane, are not useful direct sources of low density gels because of extremely long or infinite gelation times at very low concentrations. In "Transparent ultralow-density silica aerogels prepared by a two-step sol-gel process", J. Non-Crystl. Solids 145, 44 (1992), T. M. Tillotson and L. W. Hrubesh describe the preparation of an aerogel. First polysilicate is produced from tetramethoxysilane in a 16 hour reaction followed by isolation of the polysilicate and preparation of the gel therefrom—a two step, slow process.

There are no known processes for forming silica gel from a tetrafluoroalkoxysilane and water with or without the use of a catalyst. EP-A 0 232 024 describes a room-temperature-curable organopolysiloxane composition which requires for its preparation both a diorganopolysiloxane (A) terminated at both molecular chain ends with a silanol group and an organosilane compound (B) represented by the general formula $R_{4-a}Si(OR_f)_a$, wherein R is a monovalent hydrocarbon group and $R_f$ is a 2,2,2-trifluoroethyl group of the formula —$CH_2CF_3$ or a di(trifluoromethyl)methyl group of the formula —$CH(CF_3)_2$ and a is 2, 3 or 4, or a partial hydrolysis product of such an organosilane compound. An organic tin compound is also required as a catalyst to promote the condensation reaction between the components (A) and (B). U.S. Pat. No. 5,459,198 describes a fluoroinfused composite comprising a swellable polymeric material having all or a portion thereof interpenetrated with a fluoropolysilicate network prepared by contacting the swellable polymer with a solution comprising a swelling solvent, a gelling agent and at least one organofluorosilane having a perfluoroalkyl segment and three network forming groups and containing a fluoroalkyl group-silicon atom link or bond not subject to hydrolysis or thermal decomposition.

SUMMARY OF THE INVENTION

The present invention provides a rapid process for the preparation of a silica gel or a silicate polymer, comprising: contacting at least one fluoroalkoxysilane with a solution comprising water to form the silica gel or the silicate polymer. Optionally, the process can be conducted with a solvent and/or a catalyst.

The present invention also provides a low solids content wet silica gel. The present invention further provides a wet silica gel having a pore size greater than about 50 nm.

DETAILED DESCRIPTION

In the process of the present invention, at least one fluoroalkoxysilane is contacted with a solution comprising water. Upon standing for a short period of time, a silica gel or silicate polymer forms. No solvent or catalyst is required for this reaction to proceed in a rapid manner, but use of a solvent and/or catalyst is permissible. The reaction is rapid even under conditions of high dilution.

The fluoroalkoxysilane of the present invention can be a (tetrafluoroalkoxy)silane compound of formula I: $Si(OCH_2R_f)_4$ (I) or an oligomeric fluoroalkoxysilicate compound of formula II: $Si(OCH_2R_f)_{4-z}O_{z/2}$ (II), wherein: $R_f$ is a $C_1$ to about $C_{18}$ perfluoroalkyl group and can be either normal or branched; and z is a number from 0.5 to <2.0, preferably 0.5 to 1.5. $R_f$ is preferably $C_1$ to $C_8$ perfluoroalkyl; most preferably $C_1$ to $C_3$ perfluoroalkyl. The $R_f$ group can also be certain perfluoro(alkyleneoxy)-alkyl)radicals. These include perfluoro(methylene(polymethyleneoxy) methyl) radicals, such as —$(CF_2-CF_2-O)_m$—$CF_3$, wherein m is an integer of at least 2 and perfluoro ((polyisopropyleneoxy)propyl) radicals, such as —$[CF_2CF(CF_3)O]_s$—$CF_2$—$CF_2$—$CF_3$, wherein s is an integer of at least 1.

Representative examples of the (tetrafluoroalkoxy)silane compound of formula I are $Si(OCH_2CF_3)_4$ known as tetrakis (2,2,2-trifluoroethoxy)silane (FES), tetrakis (pentafluoropropoxy)silane, $Si(OCH_2C_2F_5)_4$, $Si(OCH_2C_3F_7)_4$ known as tetrakis(heptafluorobutoxy)silane (FBS), and $Si(OCH_2CF(CF_3)_2)_4$, known as tetrakis(2-trifluoromethyl-2,3,3,3-tetrafluoropropoxy)silane. Formula II is an idealized formula which corresponds to 100% condensation of the SiO groups into network structures, however, there can be residual uncrosslinked SiOH or $SiOCH_2R_f$ groups also present. z is dependent upon the molar ratio of water or other gelling agent, such as strong carboxylic acids (e.g., formic acid or trifluoroacetic acid), to silane.

Synthesis of the (tetrafluoroalkoxy)silanes of formula I can be afforded by alkoxylation of chlorosilanes or by an alcohol exchange reaction. In general, exchange with SiOR will be incomplete, making this a less desirable synthetic path than the Si—Cl/alcohol reaction. Compounds of formula (I) $Si(OCH_2R_f)_4$ are thus prepared by contacting a molar excess of fluoroalcohol having the formula $R_fCH_2OH$, wherein $R_f$ is as defined as above, with $SiCl_4$ or $Si(OR)_4$, wherein R is $C_1$ to about $C_8$ alkyl, to form the corresponding (tetrafluoroalkoxy)silane. Typically, the fluoroalcohol is added dropwise to the silicon halide or alkoxide compound, with an optional acid or base catalyst for $Si(OR)_4$ over a period of time ranging from about 30 min to about 4 hrs. The fluoroalcohol reacts to replace all of the chlorine atoms of the silicon chloride, or 1, 2, 3 or all of the alkoxy groups of the silicon alkoxide compound with fluorinated alkoxy groups, with liberation of hydrogen chloride or alcohol. The (tetrafluoroalkoxy)silane product can be recovered in a purified state by removal of solvent and residual alcohol followed by distillation of the crude reaction product. Hydrogen chloride by-product is normally removed by vacuum or by purging the reaction mixture with dry inert gas, such as argon. Specific preparations of the known fluoroalkoxysilanes $Si(OCH_2R_f)_4$, where $R_f=CF_3$ to $C_{10}F_{21}$, are found in U.S. Pat. No. 2,993,925, herein incorporated by reference.

The compounds of formula II can be made by partial hydrolysis of the compounds of formula I in the presence of z moles of water in a suitable solvent. However, if an alcohol other than $R_fCH_2OH$, such as isopropanol, is used as the solvent, some exchange of alkoxy groups occurs. Synthesis of the compounds of formula II can be prepared by dissolving a fluoroalkoxysilane, such as one having the formula $Si(OCH_2R_f)_4$, wherein $R_f$ is as defined in formula I and II, in a solvent in which water is soluble, such as trifluoroethanol. The solution is maintained, with optional heating, until the water has been substantially consumed. The solvent, byproduct alcohols and any unreacted water are then removed from the system by, for instance, distillation. The remaining material is the oligomeric fluoroalkoxysilicate.

Water is the reactive agent in the solution of the process of the present invention. A solution having a measured pH, pH*, in the range of about 2 to about 10 is preferred, and a solution with a pH* of about 6 to about 9 is most preferred. pH is strictly defined only for aqueous media; however, it is well known that measured pH values, called pH*, are useful in correlating gel times in sol-gel chemistry. See B. Coltrain, S. Melpolder, and J. Salva, Ultrastruct. Process. Adv. Mater., [Proc. Int. Conf. Ultrastruct. Process. Ceram., Glasses Compos.], 4th (1992), 69–76. Editor(s): Ulhmann, Donald R.; Ulrich, Donald R. Publisher: Wiley, New York.

In the process of the present invention, the ratio of the moles of water to the moles of fluoroalkoxysilane of formula I is designated as "r" and ranges from about 1:1 to about 20:1.

The solution may optionally further comprise a solvent and/or a catalyst. Suitable solvents for use in the present process are those capable of dissolving the fluoroalkoxysilane and water without interfering with the reaction. Representative examples of solvents are trifluoroethanol tetrahydrofuran, ethyl acetate, acetone and acetonitrile. Trifluoroethanol is preferred. Other alcohols, such as isopropanol, can be used but the reaction will proceed more slowly because of an alcohol exchange reaction between the fluoroalkoxysilane and the alcohol solvent. Some of the —$OCH_2R_f$ groups from the fluoroalkoxysilane will be replaced by the less reactive —OR groups from the alcohol.

Representative examples of optional catalysts which raise the pH* of the solution and/or supply fluoride ion are: ammonium hydroxide, ammonium fluoride or cesium fluoride. Since the present process can proceed so rapidly, it may be desirable for the solution to further comprise an additive which acts as an inhibitor. Such inhibitors can lower the pH* of the solution and reduce the reaction rate. Examples of such inhibitors are: acetic acid, carbonic acid and nitric acid.

The process of the present invention is remarkably and unexpectedly fast, at least 10 times as fast, in some cases at least 100 times as fast, and in other cases at least 1000 times as fast or more, as is found when using the corresponding non-fluorinated alkoxysilane under the same or corresponding or similar process conditions. For example, in one embodiment of the present invention, run in the absence of catalyst, the reaction is at least a thousand times faster than the reaction of the commonly used non-fluorine-containing alkoxysilane, $Si(OCH_2CH_3)_4$ (TEOS) (see Examples 6 and 15).

The present process can be run under conditions of high dilution. By "high dilution" is meant less than 1% solids by weight calculated from the mass of $SiO_2$ possible from the reaction. The reaction to form a clear gel is still quite rapid when the solids content is below 1%. The present invention further provides a wet silica gel having a solids content less than about 0.3%. It is desirable to generate wet gels of very low solids content which can serve as precursors to useful aerogels or separation media.

In the present process the fluoroalkoxysilane can be contacted with the water by combining the fluoroalkoxysilane with the optional solvent in one container and placing the water together with the solvent, if any, within a second container and then transferring the water/solvent mixture into the first container with the fluoroalkoxysilane and solvent, or vice versa, and mixing. The catalyst or inhibitor may be present in either container so long as it is soluble in the respective liquid. It is generally desirable to carry out the process of the present invention at a temperature in the range of about −40° C. to about 40° C., and preferably in the range of about −20° C. to about 25° C. Reaction to form the silica gel or silicate polymer can occur from within a few seconds to a few hours at room temperature.

The silicate polymer produced by the present invention can be used as a wet gel or it can be isolated via removal of liquid byproducts and unreacted starting materials or solvent, generally by evaporation to yield a monolith glass, gel, resin, film or coating. Drying can be at atmospheric pressure and at a temperature of from about 20° C. to about 225° C. Vacuum up to $10^{-5}$ torr may also be employed. Wet gels can also be dried to produce an aerogel by extraction with supercritical fluids, such as, for example $CO_2$ or methanol, which preserves the original pore structure in the product.

The present process is useful to make continuous silica networks in a rapid reaction with water with or without a solvent and/or a catalyst. The silica gel produced by the present process has a three dimensional structure and is a network material yielding a monolithic, clear silica gel. The silica gel has an empirical formula approaching $SiO_2$ and is of essentially infinite molecular weight. Useful coatings on a substrate for example, glass or metal, can be achieved by contacting the substrate with a solution comprising the fluoroalkoxysilane, water and optional solvent and/or catalyst prior to gelation via dip, flow or spray coating methods, with subsequent drying and optional heating up to about 350° C.

Gels generated by the present process exhibit open porosity as determined by bulk density and skeletal density analysis. Bulk density analysis provides the mass per unit volume of gel including the volume of void space of open pores. Skeletal density analysis provides the density of solid gel excluding open pore volume. If skeletal density of a given gel is higher than its bulk density, then the gel has open porosity. However, if skeletal density is equal to bulk density, the gel may either be nonporous or have closed pores.

Very low density gels can be made faster using the present process than with conventional alkoxysilanes such as tetraethoxysilane—even when the latter is catalyzed. The gels produced by the present invention can have an open pore structure of small size, for example <5 nm, when dried at atmospheric pressure. The gels produced by the present invention also possess high specific surface area and a pore size distribution which makes them useful as supports for catalysts or enzymes, gas separation media, and as column packing in chromatography. The term "open pore" means a structure having voids which are interconnected and are accessible by an unobstructed path to the surface. Pore structure can be detected by subjecting a gel to adsorption analysis of ASTM standard C1069-86 which measures nitrogen adsorption at −196° C. in four hours. This method, sometimes referred to as "BET analysis", is suitable for determining the specific surface area of gels having open pores into which nitrogen readily diffuses at −196° C. Such pores are usually larger than about 1.5 nm. The BET method described in the Journal of the American Chemical Society, S. Brunauer et al., 60 page 309 (1938), can be used to calculate specific surface area of the gel absorbent tested by adsorption analyses.

The process of the present invention further provides a low solids content wet silica gel having a pore size greater than about 50 nm. Such wet gels can be used as a separation medium, for example, for DNA.

The present process is useful for the moisture cure (condensation reactions resulting in network formation through cross-links) of $SiOCH_2R_f$ groups in films or when present on substances infused into swellable polymers, as well as for room temperature cross-linking of silane species containing $SiOCH_2R_f$ groups, which room temperature cross linking is normally applied to substances with silyl acetate groups. The present process would also be useful in the preparation of moisture-induced cross-linking agents for water-soluble polymers, such as polyvinyl alcohol (PVOH) or polymers containing Si—OH groups (e.g. polysiloxanes).

EXAMPLES

Unless otherwise specified, the trifluoroethanol used in the following examples was dried by storage over 3 A molecular sieves. The pH* measured of the dried alcohol by a glass electrode was 7.55. The undried alcohol with no exposure to molecular sieves showed a pH* of 4.90. (Definition of pH*: pH is strictly defined only for aqueous media; however, it is well known that measured pH values in water/alcohol mixtures, called pH*, are useful in correlating gel times in sol-gel chemistry. See B. Coltrain, S. Melpolder, and J. Salva, Ultrastruct. Process. Adv. Mater., (Proc. Int. Conf. Ultrastruct. Process. Ceram., Glasses Compos.), 4th (1992), 69–76. Editor(s): Ulhmann, Donald R.; Ulrich, Donald R. Publisher: Wiley, New York.)

Example 1

1006 mg $Si(OCH_2CF_3)_4$ (FES) and 493 mg dried trifluoroethanol were combined in a 5 mL vial. 501 mg dried trifluoroethanol was placed in a second vial and 84 mg water was added with a syringe. The water was highly purified (resistivity >8×10$^6$ ohm-cm). Both vials were put into a bath at 25.6° C. Then 420 mg of the water/trifluoroethanol mixture was transferred into the first vial resulting in 71 mg water, r=1.66, wherein r is the molar ratio of $H_2O$/Si. This combination was placed back into the water bath. A very clear gel was observed in 2.0 min. The gel retained its clarity with a small amount of syneresis (liquid expulsion) after four days. The gel was air dried over a period of several weeks to a very clear, dense glass.

Example 2

160 mg FES was dissolved in 1.11 g dried trifluoroethanol. In a second container 115 mg of highly purified water was dissolved in 918 mg dried trifluoroethanol (r=17.0). The second solution was added to the first with stirring over 10–20 sec. The resulting solution gelled in approximately 90 sec after the mixing was complete. The cap on the vial was removed, and the gel was allowed to dry at atmospheric pressure. No cracks were observed after 2 days. Based on complete conversion of FES into $SiO_2$, the percentage of solids in the gel was 0.98%.

Example 3

417 mg FES was dissolved in 10.95 g of dried trifluoroethanol. In a second container, 296 mg highly purified water was dissolved in 3.700 g dried trifluoroethanol. The second solution was added to the first with stirring over about 18 sec. The resulting clear solution gelled in approximately 165 sec after the start of mixing. The gel, which was very clear, showed evidence of shrinkage and expulsion of liquid in the first five minutes after gelation. Based on complete conversion of FES into $SiO_2$, the percentage of solids in the gel was 0.38%. The corresponding density of a non-shrunken aerogel would be about 0.004 g/cc.

Example 4

7.02 g FES was dissolved in 3.50 g of dried trifluoroethanol. In a second container, 1.21 g of highly purified water was dissolved in 3.50 g dried trifluoroethanol. The molar ratio of water to silane was 4.07. Both solutions were cooled to −9° C. and combined and maintained at that temperature. The resulting clear solution gelled in approximately 7.5 min after mixing. Based on complete conversion of FES into $SiO_2$, the percentage of solids in the gel was 6.53%. The sample of wet gel was allowed to dry over the course of 20 days, then was heated under vacuum to 150° C. The sample was then subjected to porosity analysis via the measurement of the nitrogen adsorption isotherm (BET method). The surface area was determined to be 799 m$^2$/g, with a pore volume of 0.43 cm$^3$/g and an average pore diameter of 2.6 nm. The bulk density was 0.981 g/cm$^3$ and the skeletal density 2.020 g/cm$^3$.

The high surface area and small pore sizes are characteristic of acid catalyzed gels made from tetraalkoxysilanes with much longer gelation times.

Example 5

A gel was made in the manner of Example 2, except that the reaction was carried out at −7.5° C., the molar ratio of water to silane was 15.0 and the calculated weight % solids were 1.06. The solution was allowed to gel in a fluoropolymer cylindrical tube. Gelation time was estimated to be 3.5 min. The gel was allowed to stand for 16 hr, by which time it had detached from the container and could be removed as an intact cylindrical log 1.56 cm in diameter. The wet gel was immersed in ethanol three times during the next 24 hr to exchange the initial pore fluid for ethanol.

The size of the pores in the wet gel was then determined by measuring the hydrodynamic relaxation under a beam-bending load, as described in G. Scherer, J. Non-crystl. Solids 142, 18 (1994). Two different measurements yielded values of 104 and 98 nm, respectively as the average pore diameters. The same measurement technique has been used on gels made from conventional tetraalkoxysilanes. Over a variety of pH conditions, those gels show pore sizes between 28 and 40 nm as wet gels. The gels made by the present invention thus have substantially larger pores than conventional wet silica gels. Further, it is well known in the art that lowering the solids content leads to larger pores. Gels which contain substantially less than 1% solids of this example have been generated by the present invention.

Example 6

92 mg 30% ammonium hydroxide was added to 35.89 undried trifluoroethanol so as to raise the pH* of the solution to 7.55. 3.08 g of the modified solvent was combined with 729 mg FES. Then 5.44 g of a 10% by weight water in undried trifluoroethanol was added to the first solution at room temperature. The addition took place over approximately 5 sec. The combined solution was observed to form a clear, uniform gel in approximately 20 sec. The percentage of solids in the gel was calculated to be 1.10%.

Example 7

The method of Example 2 was followed except the trifluoroethanol used was not dried (i.e., not exposed to molecular sieves). The pH* of the solvent was 4.90 and a 0.97% solids solution gelled in 3.5 hr. The gel was uniform and transparent.

Example 8

The method of Example 6 was followed except that a smaller amount of ammonium hydroxide was added to the solvent so as to raise its pH* to 6.41. A 1.13% solids solution gelled in 1.25 min. The gel was uniform and transparent.

Example 9

0.359 g FES dissolved in 0.900 g dried trifluoroethanol was added to a solution of 0.107 g pH 4.0 buffer solution of potassium hydrogen phthalate dissolved in 0.899 g of trifluoroethanol. A clear, homogeneous gel was formed in 75 min. The percentage of solids in the gel was calculated to be 2.24%.

Example 10

The method of Example 9 was followed except that a pH 10.0 buffer of sodium carbonate and sodium hydrogen carbonate was used. A clear, homogeneous gel was formed in 6 sec.

Example 11

The method of Example 6 was followed, except that the solvent used was tetrahydrofuran. Sufficient ammonium hydroxide was added to the solvent to raise the pH* to 10.17. A homogeneous gel was formed in 9 sec at room temperature.

Example 12

The method of Example 11 was followed, except that no ammonium hydroxide was added to the solvent. The gel time was 52 hr. The pH* of the solvent was measured to be 6.10. Ethers such as THF are known to generally have a retarding effect on gelation times.

Example 13

The method of Example 6 was followed, except that glacial acetic acid was added to the trifluorethanol (0.1% by weight) so as to decrease the pH* to 2.01. A 1.06% solids solution gelled in approximately 9 hr.

Example 14

0.364 g FES was dissolved in 2.697 g undried trifluoroethanol. A second solution was prepared by adding 37 mg of a 1% solution of CsF in water to 0.240 g water in 2.16 g undried trifluoroethanol. The second solution was added to the first. The combined solution formed a clear gel in 70 sec.

Example 15

Comparative 998 mg TEOS was dissolved in 13.254 g anhydrous ethanol. A second solution of 1.37 g highly purified water in 13.25 g ethanol was prepared and added to the first solution at room temperature. The combined solutions contained 1.00% solids on a silica basis. The measured pH of the solvent plus water was 8.1. No gelation or even viscosity increase was observed over a time span of 48 hours. The corresponding fluoroalkoxy system (cf. Example 6) gelled in 20 secs or less.

Example 16

The method of Example 2 was followed except that the calculated solids content was 0.14%. Gelation was somewhat difficult to observe, but was estimated to be about 40 min. A portion of the gel was allowed to dry at room temperature and pressure and yielded a small, continuous piece of glass, indicative of a single network in the wet gel.

Example 17

283 mg highly purified water was added slowly to 4.79 g FES with vigorous stirring. The molar ratio of water to silane was 1.39. The two fluids were initially immiscible, but formed a hazy solution after 20 min. On standing for 15 hrs, the solution formed a translucent gel. The precise time of gelation was not observed.

What is claimed is:

1. A process for preparing a silicate polymer or silica gel, comprising: contacting at least one fluoroalkoxysilane of formula I or formula II

$$Si(OCH_2R_f)_4 \qquad (I)$$

$$Si(OCH_2R_f)_{4-z}O_{z/2} \qquad (II)$$

wherein:

$R_f$ is a $C_1$ to about $C_{18}$ perfluoroalkyl group; and z is a number from 0.5 to <2.0, with a solution comprising water to form the silicate polymer or the silica gel.

2. The process of claim 1 wherein the measured pH of the solution is from about 2 to about 10.

3. The process of claim 2 wherein the measured pH of the solution is from about 6 to about 9.

4. The process of claim 1, 2 or 3 wherein the solution further comprises a solvent.

5. The process of claim 4 wherein the solvent is selected from the group consisting of: trifluoroethanol, tetrahydrofuran, ethyl acetate, acetone, isopropanol and acetonitrile.

6. The process of claim 5 wherein the solvent is trifluoroethanol.

7. The process of claim 4 wherein the solution further comprises a catalyst.

8. The process of claim 7 wherein the catalyst is selected from the group consisting of: ammonium hydroxide, ammonium fluoride and cesium fluoride.

9. The process of claim 1 wherein the solution further comprises an inhibitor to reduce the reaction.

10. The process of claim 1 wherein the moles of water to the moles of fluoroalkoxysilane is from about 1:1 to about 20:1.

11. The process of claim 1 wherein $R_f$ is $C_1$ to $C_8$ perfluoroalkyl.

12. The process of claim 11 wherein the fluoroalkoxysilane is $Si(OCH_2CF_3)_4$.

13. The process of claim 1 wherein the solids content of the silicate polymer or the silica gel is <1% by weight, said solids content calculated from the mass of $SiO_2$ possible from the reaction.

* * * * *